United States Patent [19]

Turner

[11] 4,171,620

[45] Oct. 23, 1979

[54] COOLING METHOD AND SYSTEM

[76] Inventor: Nelson C. Turner, P.O. Box 36100, Houston, Tex. 77036

[21] Appl. No.: 883,220

[22] Filed: Mar. 3, 1978

Related U.S. Application Data

[63] Continuation-in-part of Ser. No. 743,043, Nov. 18, 1976, abandoned.

[51] Int. Cl.² ............... F25B 27/00; F25D 17/06; F28D 5/00; F24J 3/02
[52] U.S. Cl. .................................. 62/2; 62/94; 62/271; 62/311; 126/432; 203/18
[58] Field of Search ........... 62/271, 309, 310, 94, 62/2; 126/270; 55/32, 52; 206/234; 203/18, 49

[56] References Cited

U.S. PATENT DOCUMENTS

| | | | |
|---|---|---|---|
| 2,138,691 | 11/1938 | Altenkirch | 62/311 |
| 2,778,782 | 1/1957 | Stutz | 203/18 |
| 3,303,838 | 2/1957 | Thomason | 126/271 |
| 3,450,603 | 6/1969 | Meyers et al. | 203/18 |
| 3,841,382 | 10/1974 | Gravis et al. | 203/18 |
| 3,875,926 | 4/1975 | Frank | 202/234 |
| 3,880,719 | 4/1975 | Massie | 202/234 |
| 3,894,528 | 7/1975 | Stubblefield | 126/271 |
| 4,010,065 | 3/1977 | Alleman | 55/32 |
| 4,011,731 | 3/1977 | Meckler | 62/271 |
| 4,026,681 | 5/1977 | Roskelley | 55/32 |

*Primary Examiner*—Lloyd L. King

[57] ABSTRACT

A cooling method and system are provided wherein a stream of relatively wet warm air is passed in contact with a liquid hygroscopic material in a water cooled absorbent zone to produce a stream of relatively cool dry air. The latter is then passed through an evaporative cooling zone in contact with water and the resulting cooled air or water is used as a cooling or refrigerating medium. A portion of the cooled water is used to cool the absorbent zone to an extent that the dried stream of air has a greater capacity to evaporatively cool the water than it would have in the absence of such cooling, thereby permitting the production of desired stream of cool, dry air. The relatively wet liquid hygroscopic material resulting from the drying of the air as above mentioned, is then passed as a film through a heating zone wherein it is exposed to solar heat or other low level heat to evaporate absorbed water from the hygroscopic material with the evaporated water being swept away from the film by a stream of ambient air which is ultimately discharged to the atmosphere.

A method and apparatus are also provided for contacting a gas and a liquid to facilitate a mass exchange therebetween, especially when the volume of the liquid is small compared to that of the gas and where extensive contact between the liquid and gas is necessary to achieve the desired mass exchange. Also, provision is made for removing heat from the liquid during its contact with the gas. Thus, a plurality of finned heat exchangers are stacked, one above the other, and the liquid to be contacted is fed onto the upper heat exchanger at one end thereof so that it is free to flow along the vertical surfaces of the fins.

17 Claims, 9 Drawing Figures

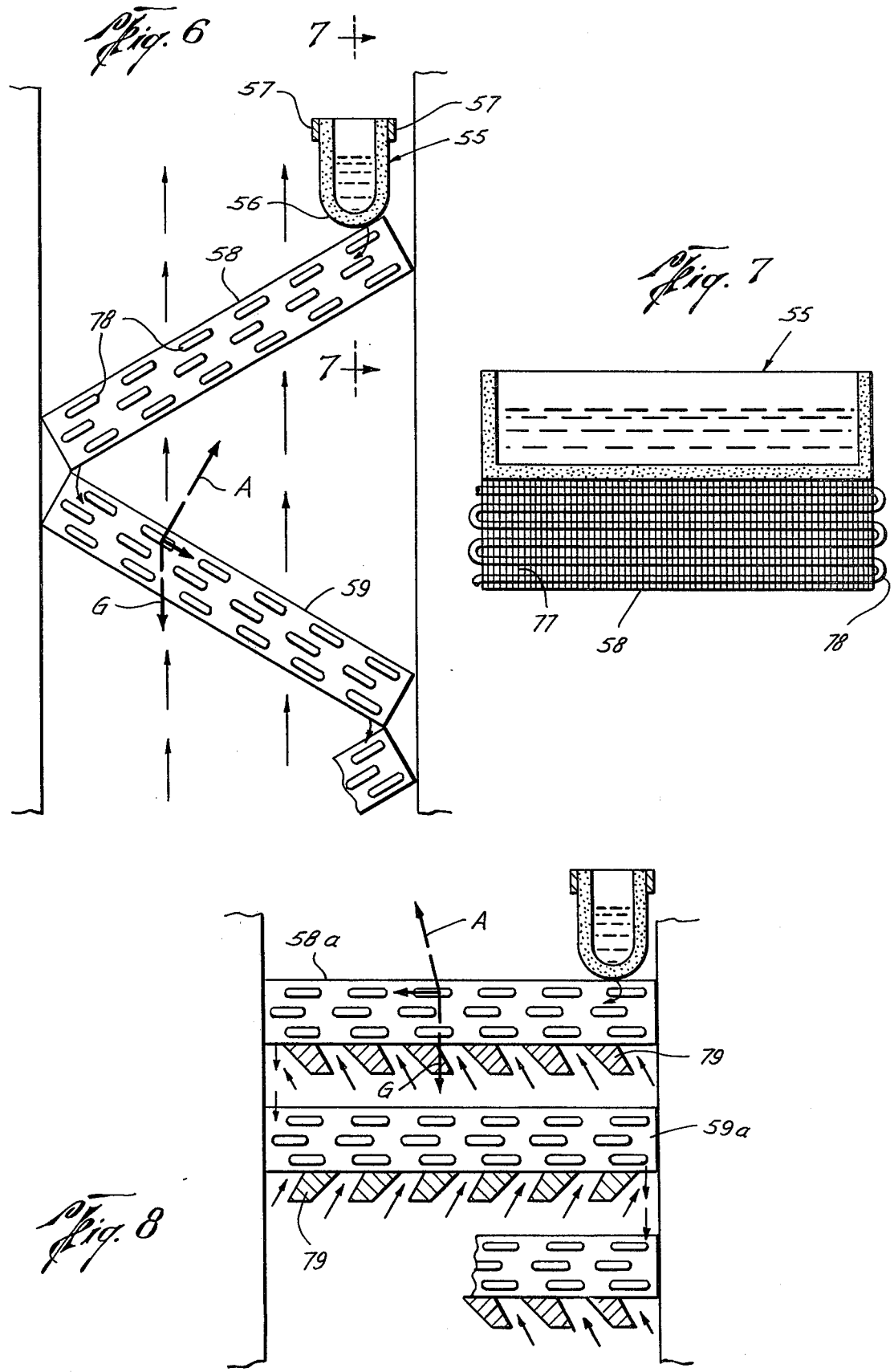

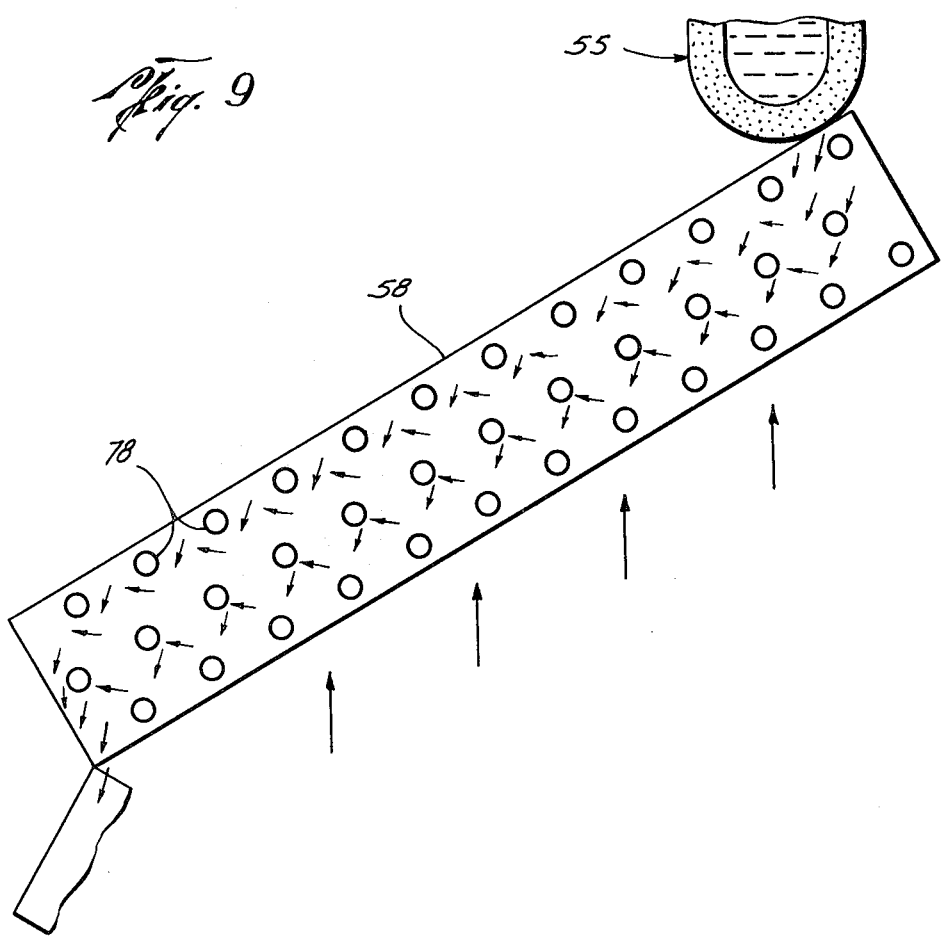

COOLING METHOD AND SYSTEM

This application is a continuation-in-part of my co-pending application Ser. No. 743,043 filed Nov. 18, 1976 now abandoned.

This invention relates to a cooling method and system which provides a cooling or refrigerating medium which can be used, for example, to air condition buildings and the like. It also relates to a method and apparatus for efficiently contacting a gas and a liquid to facilitate a mass transfer therebetween, especially when the volume of the liquid is quite small compared to that of the gas.

Proposals have been made in the past relating to the use of solar energy or other low level source of heat for refrigerating or air conditioning purposes. For example, it has been proposed to use a solid desiccant to dry air and then to humidify the air to cool it for air conditioning purposes. The solid desiccant is periodically regenerated by heating it with solar energy. Examples of such proposals are shown, for example, in the Altenkirch U.S. Pat. Nos. 2,138,690 and 2,138,691. These arrangements involve the disposition of the solid desiccant at least along the roof of a building for exposure to solar energy and, by present day standards, are obviously unusable. It has also been proposed to operate absorption type refrigerating apparatus by employing solar energy as a heat source for separating the refrigerant from a carrier fluid. However, such a system involves all the well known attendant difficulties with absorption refrigeration systems and likewise they are of relatively high expense.

Additionally, it has been suggested (Meckler U.S. Pat. No. 4,011,731) to store solar energy in a heat sink and then to use heat from this sink to regenerate hygroscopic glycol which has been used to dry air. The dry air is then cooled using a conventional absorption or compression-evaporation refrigeration system. The air may be further cooled in a humidifier. Here, again, conventional refrigeration apparatus must be employed.

It is an object of this invention to provide a cooling method and system utilizing the principles of a simple evaporative cooler and yet which can be operated in climates of relatively high humidity utilizing solar or other low level energy as the principal energy source.

Another object is to provide such as method and system which eliminates the need for conventional absorption and compressor-evaporator systems now in common use in air conditioning system thereby likewise avoiding their attendant high electrical or equivalent energy consumption.

Another object is to provide such a method and system in which the air to be used in the evaporative cooler is pre-conditioned by drying and cooling it with a liquid hygroscopic material in an absorption zone which is cooled by cool water from the evaporative cooler so to extract heat to an extent such that the dried stream of air has a greater capacity to evaporactively cool water than it would have in the absence of such cooling.

Another object is to provide such a method and system wherein relatively humid air which is ultimately to be used in an evaporative cooling system is dried utilizing a liquid hygroscopic agent, the latter being regenerated in a solar unit at temperatures readily attainable by exposure of the hygroscopic liquid or ordinary sunlight and well below the boiling point of the hygroscopic liquid.

Another object is to provide a system which facilitates the regeneration of a hygroscopic liquid by solar or other low level energy at temperatures only nominally above ambient.

In such a method and system, as will be made clearer below, there is a need to intimately contact the liquid hygroscopic material and the air in order to efficiently dry the air. Due to the nature of the system, very small quantities of the hygroscopic material are utilized relative to the volume of air. Therefore, there is the problem of disposing thin films of the hygroscopic material over large areas in order to obtain efficient contact of the air with all of the small amounts of hygroscopic material, in a manner so as to permit mass transfer from the air to the hygroscopic material.

It is, therefore, another object of the invention to provide a method and apparatus for contacting a gas and a liquid wherein the liquid is discharged onto vertical parallel surfaces so as to be exposed to gas flowing upwardly between such surfaces, the arrangement being such that the resultant of the forces exerted by the gas flow and by gravity on the liquid is such that the liquid flows laterally across said surfaces, thereby providing large areas of liquid exposed to the gas.

Other objects, advantages and features of the invention will be apparent upon consideration of the specification, the claims and the drawings wherein:

FIG. 6 is an elevational view of an upper portion of the gas-liquid contactor shown in FIG. 5;

FIG. 7 is a view taken upon the line 7—7 of FIG. 6;

FIG. 8 shows another arrangement of the contacting units from that shown in FIG. 6; and FIG. 9 is a cross-sectional view of one of the contact units shown in FIG. 6.

Figure 1:
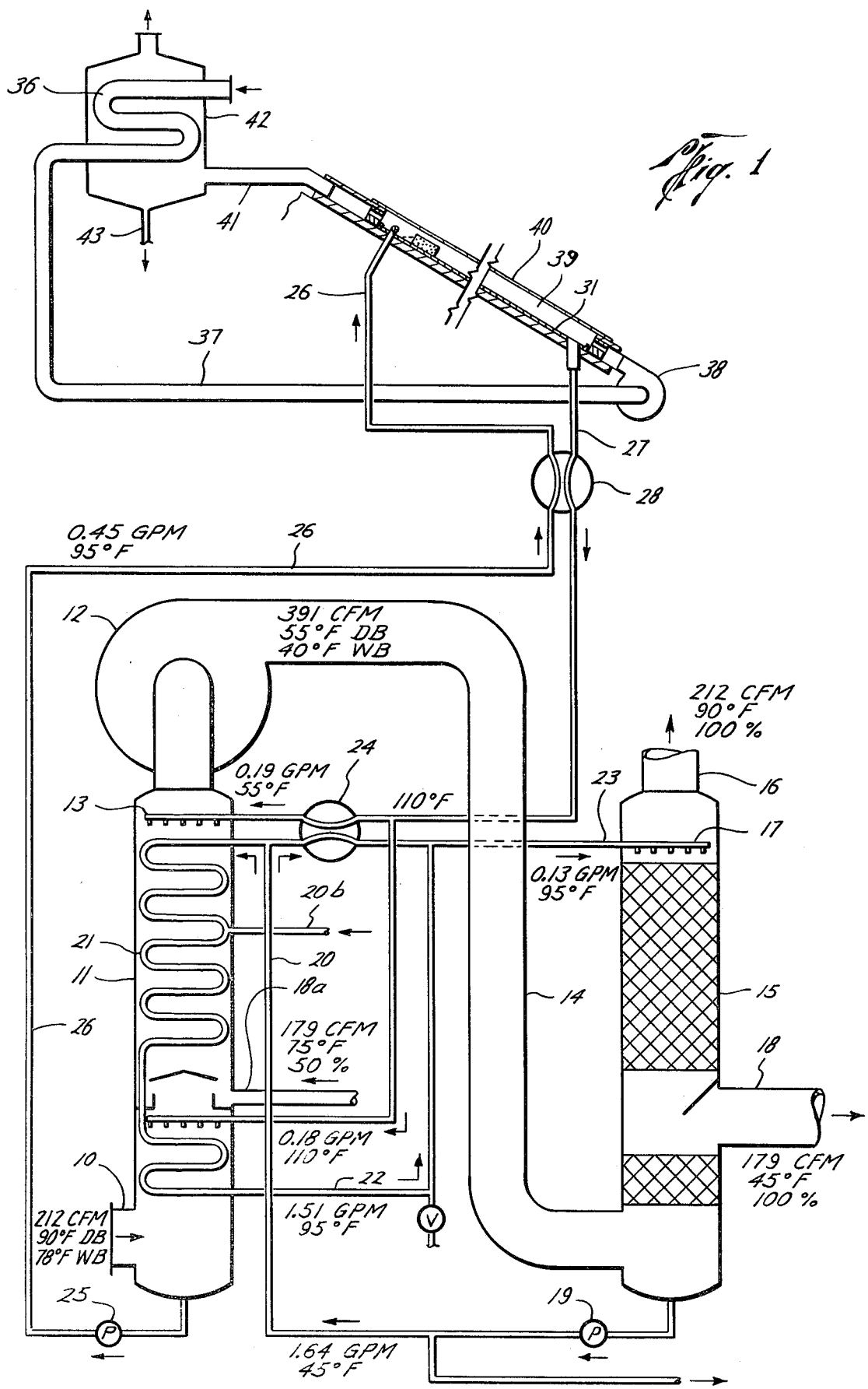
FIG. 1 is a rather diagrammatic schematic of one form of the system capable of performing the method in accordance with the invention.
Figure 2:
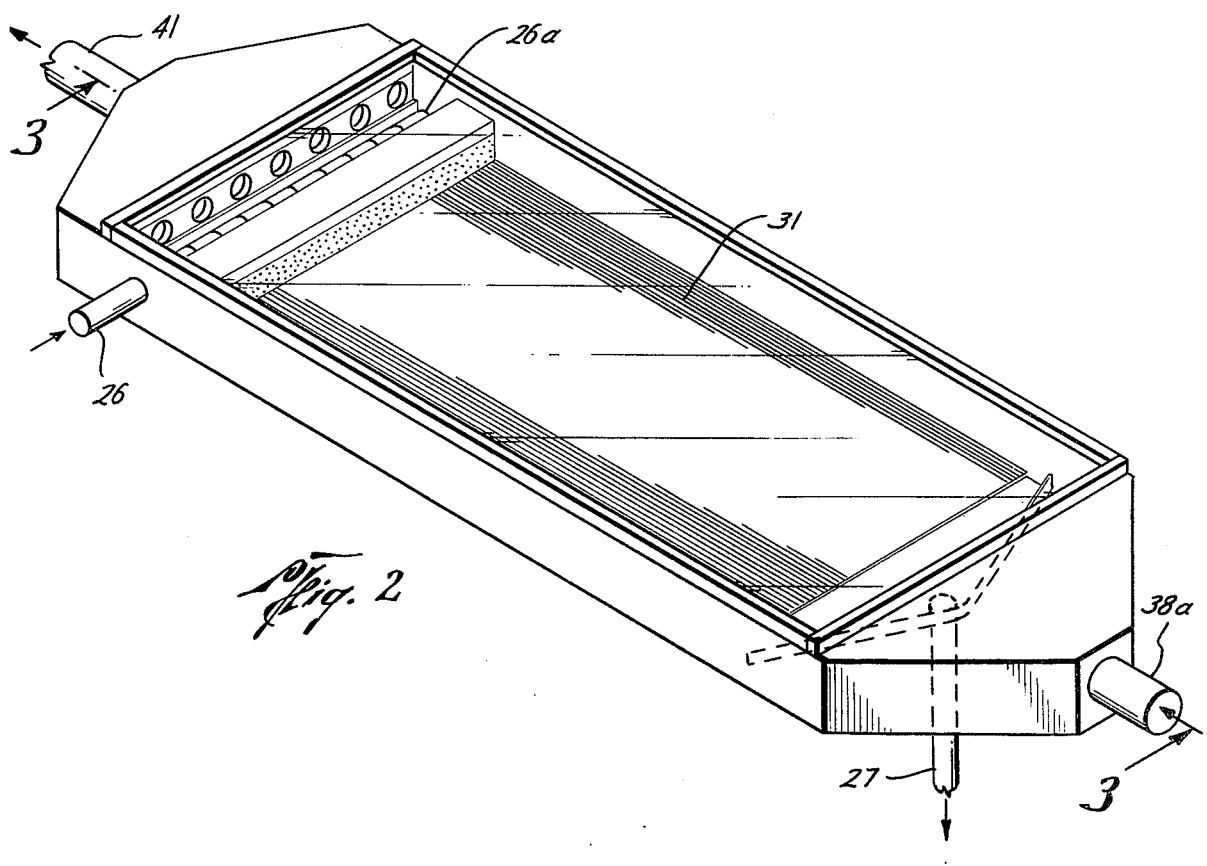
FIG. 2 is a view of the preferred form of a solar regeneration unit for the hygroscopic liquid.
Figure 3:
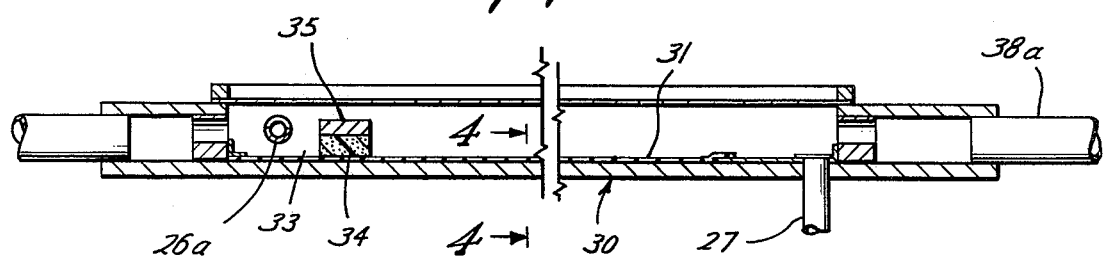
FIG. 3 is a view taken on the line 3—3 of FIG. 2.
Figure 4:
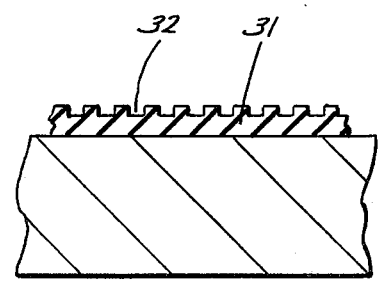
FIG. 4 is an enlarged view taken on the line 4—4 of FIG. 3.

FIG. 1 of the drawings represents a system for cooling air which is to be employed to air condition a building. The value of the various parameters in the system have been listed in the drawing as representative of those values which have been calculated to yield an overall refrigeration capacity of approximately 10,440 BTU's per hour (0.87 tons of refrigeration). These values are intended to be illustrative only and can be varied to achieve various purposes as will be readily apparent to one skilled in the art after studying this disclosure.

The method and system involves the use of a hygroscopic material which has the properties of being a liquid at the operating conditions of the method of system, thermally and chemically stable, and preferably miscible with water and of relatively low cost. A preferred material is triethylene glycol although it will be appreciated that other materials can be used. Therefore, the reference to "glycol" throughout the following description is not necessarily intended to be a limiting term.

Ambient air which may be of a relatively high humidity (e.g., over 50% relative humidity) is passed through an inlet 10 and is drawn upwardly through an absorbent zone 11 by a blower 12. A relatively dry glycol stream is fed into the absorbent zone via a header 13 or the like for countercurrent flow down through the absorbent zone in contact with the upwardly rising stream of air. As a result, the relatively humid ambient air is dried. Absorbent zone 11 can be packed with any suitable material which can be wetted by the glycol so as to increase the surface thereof exposed to the air, and the preferred "packing" is described hereinafter in connection with FIGS. 5-7.

The resulting relatively dry air is blown by blower 12 via a conduit 14 for upward flow through an evaporative cooling zone 15 to be finally discharged to the atmosphere via a vent 16. Water is passed into the evaporative cooling zone via a header 17 for downward and countercurrent flow to the uprising air. As a result, the water is cooled to a relatively low temperature and can in itself be used as a refirgerating medium. Alternatively, a stream of cool air is withdrawn through a conduit 18 for use as a refrigerating medium. The point of withdrawal should be such that the incoming dry air has been cooled to the desired refrigerating or cooling temperature. Return air can be returned via conduit 18a.

Figure 5:
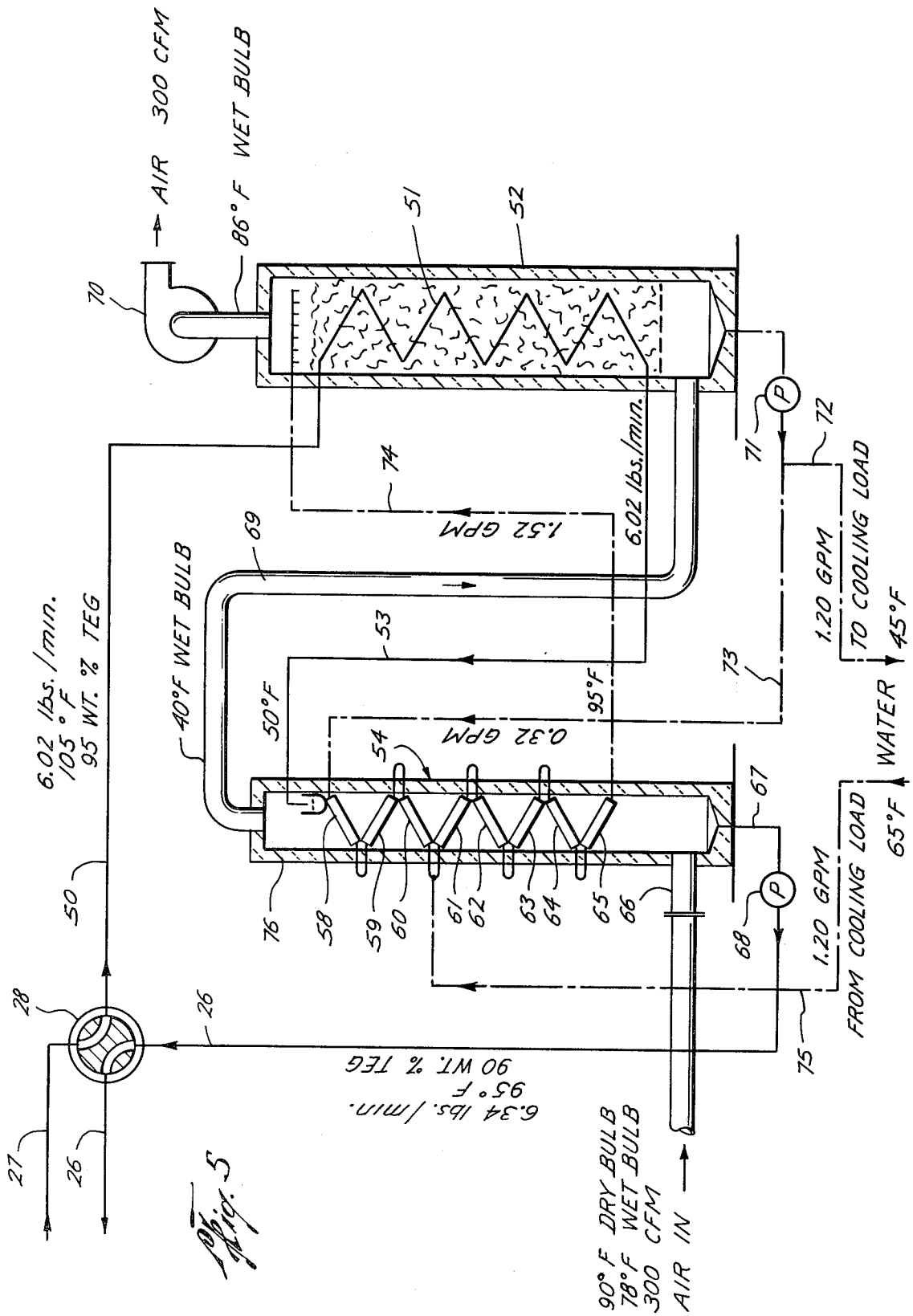
FIG. 5 is a view like FIG. 1 except showing a more preferred form of the system capable of performing the method in accordance with a more preferred mode of the invention.

In accordance with one aspect of this invention, the absorption zone is cooled with at least a portion of the cool water from the evaporative cooling zone to extract heat therefrom to such an extent that the dried stream of air has a greater capacity to evaporatively cool the water in the evaporative zone than it would have in the absence of such cooling. For example, the cooling can be sufficient that the dried air has a wet bulb temperature and a relative humidity less than that of the input stream of air. For the specific example shown in FIG. 1, the input and output air has the indicated dry and wet bulb temperatures and, as will be seen from a standard psychrometric chart, their respective relative humidities are about 60% and 22%. The system can be operated over a broad range of output dried air conditions by regulating the degree of cooling of the absorption and, at least in theory, the cooling can be such as to almost cause freezing of the water in the evaporative cooling zone. Thus, the cooled water can be withdrawn from the evaporative cooling zone and pumped, as by pump 19, and via a conduit 20, through a cooling means 21 located in the absorption zone 11 and then finally returned via conduits 22 and 23 to the evaporative cooling zone. The cooling means 21 can be of any appropriate configuration which will permit heat exchange between the upflowing air, the downflowing glycol and the cooling water in the absorption zone in such a manner as to cool the absorption zone as aforesaid. However, the configuration shown in FIGS. 5-7 is preferred. As a result of this heat exchange feature in the absorption zone, the glycol can be maintained at a relatively low temperature, thereby increasing its capacity to dry the air, which in turn affords a low wet bulb temperature for the air. Hence, the cooling effect of the latter in the evaporative cooling zone is greater, i.e., the water in such zone can be cooled to a lower temperature than it could in the absence of cooling in the absorption zone.

Likewise, a portion of the cooled water can be passed through a heat exchanger 24 to cool the incoming glycol which will again permit the dry air to achieve a lower wet bulb temperature.

The relatively wet glycol can be pumped by pump 25 through a conduit 26 to a regeneration zone which can be termed a "solar collector". The regenerated or dried glycol is subsequently passed via a conduit 27 through heat exchanger 28 and thence to the previously described heat exchanger 24 to the absorption zone.

The solar unit or regenerating means includes an inclined support 30 shown as a semi-rectangular boxlike structure having an upper face exposed to receive solar energy. The upper face preferably comprises a mat 31 having a plurality of parallel flow channels 32 therein which channels can be rectangular as shown or "V" shaped. The wet glycol is caused to spread as a film over the mat and to flow downwardly thereon by gravity. The channels in the mat and the corresponding ribs assure that the flow of glycol is uniform along the mat.

In order to assure that the wet glycol is uniformly distributed over the width of mat, it is passed through a slotted feed header 26a into a feed chamber 33. It will be noted that the mat extends into this chamber. A distributor in the form of a sponge-like material 34 is disposed transversely of the mat at its upper end and held in place by a simple means such as compression member 35. The latter can be made so that it can be adjusted to vary the compression of the sponge-like material 34 and thereby regulate, to some extent, the volume of glycol flowing through the sponge-like member. With this arrangement, the incoming glycol will back up into a pool extending along the upper side of sponge-like member 34 and the latter will regulate the flow of glycol to be uniform along the width of the mat so as to form a uniform film across the mat. In view of the relatively small quantities of liquid glycol being passed through the solar collector, per unit of time and area, the resulting film of glycol on the mat will be extremely thin and normally will be only a few thousandths of an inch in depth. As a result, solar energy can uniformly heat the film of glycol over the entire surface of the mat resulting in uniform evaporation of water therefrom.

As water is evaporated from the glycol, it is carried off by a stream of amient air passing through the regeneration zone. Thus, ambient air is drawn preferably through an air-to-air heat exchanger 36 and thence passes through a conduit 37 to a blower 38. The blower discharges the ambient air into the space 39 between the mat 31 and the transparent closure member 40 of glass or the like. Air passing through space 39 sweeps the water vapor evaporated from the glycol upwardly through the solar collector and thence out a conduit 41 to be passed through the vessel 42 in indirect heat exchange with the incoming ambient air. This permits the recovery of any entrained and vaporized glycol in the air being discharged from the solar collector and the recovered glycol can be passed to a suitable return 43.

With this arrangement, it is possible to regenerate the wet glycol at temperatures not far exceeding ambient air temperature. Thus, the temperature of the hot regenerated glycol before cooling will be normally within the range of 110° to 150° F. Temperatures within this range will be seen to be substantially below the boiling point of the glycol. Therefore, the glycol can be regenerated in an effective manner even on days when direct solar energy is minimal.

While air is described above as the medium for cooling a building space or the like, it is also possible and sometimes desirable to use cold water for that purpose. In such cases, conduit 18 and return air conduit 18a are closed and a portion of the water discharged by pump 19 can be passed via conduit 20a to the space to be cooled. Return water is preferably passed into cooling means 21 at a point, indicated by conduit 20b, at which the temperature of the return water is equal to the temperature of the downflowing water in the cooling means.

A more preferred form of the invention is shown in FIGS. 5–7. In this arrangement, the dried glycol from the regenerator (not shown in FIG. 5, but illustrated in FIG. 1) is passed via conduit 27, heat exchanger 28 and conduit 50 through a cooling coil 51. The latter is disposed in evaporative cooling zone or vessel 52 so that the glycol can be cooled before passing via conduit 53 to absorption zone 54. The cool dried glycol is discharged into a header 55. The latter comprises a U-shaped channel 56 (FIG. 6) of sponge like material, such as open-cell sponge rubber, supported by supports 57, and extending across the width of the upper gas-liquid contact unit 58, the nature of the latter being described below. As will be made more fully apparent below, the glycol flows serially along the contact units 58–65, where it is exposed to the input air flowing from the inlet 66 upwardly through the contact units. The resulting relatively wet glycol then flows from the bottom of the absorption zone via conduit 67, pump 68 and conduit 26 back to the solar regeneration cell where it is regenerated as aforesaid.

The relatively dry cool air from the absorption zone is passed via conduit 69 into the evaporative cooling zone 52 wherein it evaporatively cools the water and is finally discharged to the atmosphere via blower 70.

The water which has been evaporatively cooled in evaporative cooling zone 52 is pumped by a pump 71 via conduit 72 to the load to be cooled. At least a portion of the water from pump 72 is passed via conduit 73 to the absorption zone to cool the latter explained in connection with the description of FIG. 1. This water passes through the gas-liquid contact units in indirect heat exchange with the air and glycol and is finally discharged via conduit 74 into an upper portion of evaporative cooling zone 52 for contact with the upwardly flowing air. The relatively warm return water from the load is preferably passed via conduit 75 into one of the contact units at a level where the temperature of the return water approximately equals that of the cooling water flowing downwardly through the units.

In accordance with a preferred mode of this invention, the absorption zone comprises a vertical vessel 76 containing a plurality of contact units 58–65 stacked in a zig-zag configuration as shown in FIG. 5 and partially in FIG. 6. Each contact unit is in the nature of a finned heat exchanger having a plurality of substantially vertical, laterally elongate spaced apart parallel metallic fins or sheets 77. These fins are supported by and are in heat exchange-contact with conduits or heat exchange tubes 78. The latter conducts the cooling water, in several passes per contact unit, through the units to cool the fins or plates. As shown in FIG. 5, the water passes serially through the units from the uppermost to the lowermost.

The glycol passing from the header 55 onto the fins of the upper contact unit would normally, in the absence of upwardly flowing air, flow downwardly by gravity along the surfaces of the fins at one end of the contact unit until it reaches the lower edges of the fins where it would either flow along such edges or drip down onto the next lower unit. In accordance with this aspect of the invention, the air is caused to flow through the units so that the forces exerted by the air flow and by gravity on the films of glycol is such that the glycol flows laterally across the surfaces of the fins to the other end of the contact unit. Thus as shown in FIG. 6, gravity exerts a vector force G on the glycol causing it to want to flow vertically downward. The upflowing air, on the other hand, exerts a vector force A on the glycol in an upward direction at an angle with the vertical. The resultant force on the glycol is substantially parallel to the length of the units so that the glycol flows laterally from one end of a unit to another.

Referring to FIG. 8, another form of contacting unit is illustrated. In this form, the fin and tube portions of the contacting units are physically the same as those of FIG. 6. However, the units are disposed horizontally and include means 79 for deflecting the normally vertically flowing air so that it flows at an angle with the vertical across the sheets or fins to cause the glycol to flow laterally across the contact units. Here again, gravity exerts a vertically downward vector force G on the glycol while the upflowing air exerts a vector force A at an angle with the vertical so that the resultant force on the glycol is approximately horizontal.

FIG. 9 is a vertical cross-section through one of the contact units and header 55 and illustrates flow patterns of the glycol. The glycol as it flows onto the fins forms a film on the fin surface and, when the fins are properly spaced, also forms many droplets bridging across the space between adjacent fins. These droplets are acted upon by the flowing air which tends to lift them upwards against the counteracting force of gravity. Due to the varying spacing between the tubes intersecting the fins, the air velocity and tubulence varies over the depth of the fins so that the droplets move in erratic paths across the fins as indicated by the arrows in FIG. 9. It is thought that these droplets exert a spreading action of the glycol on the fins. At any rate, they cause a turbulent flow of glycol and air which enhances the mass exchange therebetween.

By experiment, it has been found that the optimim spacing between the fins to achieve satisfactory mass tansfer is that which will cause capillary bridging between the fins to form the droplets mentioned above. In terms of numbers, a spacing of 0.08 inches (surface to surface) between the fins has been found satisfactory for glycol and for most other liquids.

The invention having been described, what is claimed is:

1. In a method of cooling, the steps of passing an inlet stream of relatively warm and wet air into an absorbing zone and therein contacting it with a liquid hygroscopic material, cooling the absorbing zone sufficiently that the resulting dried stream of air has a greater capacity to evaporatively cool water than it would have in the absence of such cooling; using the resulting dried stream of air to evaporatively cool water; and using at least some of the resulting cooled water to cool said absorbing zone.

2. The method of claim 1 wherein the resulting wet stream of hygroscopic material is regenerated by heating it with solar heat to vaporize water therefrom.

3. The method of claim 2 wherein the wet stream of hygroscopic material is spread as a film in a regeneration zone and is caused to flow as such film by gravity while exposed directly to said solar heat.

4. The method of claim 3 wherein the hygroscopic material is triethylene glycol.

5. The method of claim 3 wherein a stream of ambient air is passed across said film to carry off vaporized water and then is discharged together with the vaporized water to the atmosphere.

6. In a method of cooling utilizing heat energy comprising the steps of passing an input stream of relatively warm wet air into an absorbing zone and therein contacting it with a relatively dry liquid hygroscopic material while cooling said absorbing zone sufficiently to remove at least some of the latent heat of the water removed from the air to produce an output stream of relatively dry air having a wet bulb temperature and a relative humidity less than that of said input stream of air; passing the resulting wet mixture of water and said hygroscopic material through a regeneration zone and therein heating it to vaporize water therefrom at a temperature below the boiling point of the wet mixture; contacting the output stream of dry air with water to evaporatively cool the latter; and passing a portion of the thus cooled water to the absorbing zone to cool the latter as aforesaid.

7. The method of claim 6 wherein said heating in said regeneration zone is by exposing the water and hygroscopic material therein to solar energy.

8. The method of claim 7 wherein a stream of ambient air is passed through the regeneration zone to carry off vaporized water and then discharging such air and vaporized water to the atmosphere.

9. The method of claim 8 wherein the hygroscopic material is triethylene glycol.

10. The method of claim 7 wherein the wet mixture is spread into a thin film of liquid in the regeneration zone and is caused to flow as such film by gravity through a heating zone, the thin flowing film being directly exposed to solar energy to vaporize water therefrom as aforesaid.

11. The method of claim 10 wherein the ambient air is mechanically circulated through the regeneration zone in countercurrent contact with such film of flowing mixture.

12. In a system for cooling utilizing solar energy or other low level heat comprising means for regenerating a relatively wet mixture of water and a liquid hygroscopic material by exposure to solar energy or other low level heat and for causing air to flow over the mixture so exposed to carry off water vaporized therefrom and for discharging the resulting vapor-laden air to a point external of the system; means for contacting the regenerated mixture with a relatively wet gas stream to produce a relatively dry gas stream, means for contacting the relatively dry gas stream with water to thereby cool the water; and means for causing heat exchange between at least a portion of the cooled water and the materials within the first mentioned contact means.

13. The system of claim 12 wherein the regenerating means includes (i) an inclined support having an upper face exposed to receive solar energy, (ii) a distributor for the wet mixture comprising a sponge-like material extending across a width of the upper face adjacent its upper end, and (iii) an inlet for the wet mixture to cause it to flow along the distributor to be distributed thereby over the upper face as a thin film.

14. The system of claim 13, wherein the upper face has a plurality of parallel flow channels therein extending lengthwise from an upper to a lower portion of said upper face to reduce cross flow of the wet mixture on the upper face.

15. In a system for cooling comprising means for contacting a relatively warm wet stream of air with a liquid hygroscopic material in an absorbent zone to produce a relatively dry and cool stream of air; means for contacting the relatively dry air stream with water to thereby cool the water; means for causing at least a portion of the thus cooled water to extract heat from the absorbent zone to an extent such that the dried stream of air has a greater capacity to evaporatively cool said water than it would have in the absence of such cooling; and means for evaporating water from the wet hygroscopic material after it has contacted said wet stream of air in said absorbent zone.

16. The system of claim 15 wherein said means for evaporating includes a solar collector in which the wet hygroscopic material is directly exposed to solar energy.

17. The system of claim 16 wherein means are provided for passing ambient air through the solar collector to remove evaporated water therefrom and to discharge the same to atmosphere.

* * * * *